Figure 1:
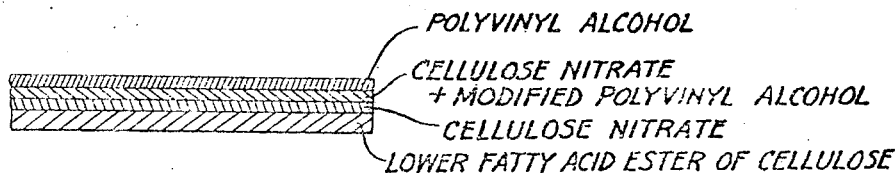

Nov. 14, 1944.   G. F. NADEAU ET AL   2,362,580

LAMINAR STRUCTURE AND ITS PREPARATION

Filed May 15, 1943

GALE F. NADEAU
CLEMENS B. STARCK
INVENTORS

BY *N. M. Perrins*
*Daniel J. Mayne*
ATTORNEYS

Patented Nov. 14, 1944

2,362,580

UNITED STATES PATENT OFFICE 2,362,580

LAMINAR STRUCTURE AND ITS PREPARATION

Gale F. Nadeau and Clemens B. Starck, Rochester, N. Y., assignors to Eastman Kodak Company, Rochester, N. Y., a corporation of New Jersey Application May 15, 1943, Serial No. 487,118

7 Claims. (Cl. 117—73)

This invention relates to laminar structure in which cellulose ester sheeting is attached to a layer of polyvinyl alcohol.

Cellulose ester sheeting is widely employed as a support for layers of various materials thus providing a laminar structure having the strength and durability of the cellulose ester sheet but the surface of the laminar structure exhibits the properties of the exterior layer which is supported by the cellulose ester sheet. For instance, photographic film is ordinarily composed of a cellulose ester sheet as the support with a silver halide-gelatin emulsion thereon, the cellulose ester sheet imparting rigidity and giving protection to the emulsion.

Often times, however, the use of cellulose ester sheeting as a support for layers of water-soluble materials presents difficulties because of the lack of adherence of those layers ordinarily to cellulose ester sheeting. For instance, in the making of photographic film it has often been necessary to apply subbing layers over cellulose ester sheeting to cause the adherence of a gelatin emulsion thereto. These subbing methods however, are confined to causing the adherence of the gelatin to the cellulose ester support and therefore the methods taught in the prior art are not suitable as a rule for providing a method of causing the adherence of a polyvinyl alcohol layer to cellulose ester sheeting.

One object of our invention is to provide a method of laminating cellulose ester sheeting and a polyvinyl alcohol layer so that firm adhesion is obtained. Other objects will appear herein.

We have found that a polyvinyl alcohol layer can be made to adhere to cellulose ester sheeting by interposing between the layer and the sheeting a layer comprising a mixture of cellulose nitrate and a modified polyvinyl alcohol. We have found that by mixing a modified polyvinyl alcohol having a polyvinyl alcohol content of 65-85% with cellulose nitrate and applying it in the form of a solution as a subbing layer to a cellulose ester surface, a surface is provided to which a polyvinyl alcohol layer will readily adhere forming a unitary product.

The product in accordance with our invention serves any purpose in which a polyvinyl alcohol layer supported by cellulose ester sheeting is desirable. For instance, in certain optical products such as polarizing lenses, the polarizing grating may reside in a polyvinyl alcohol layer and the cellulose ester sheet provides the support therefor and because of its transparency will allow the light to pass therethrough. Another use for the product in accordance with our invention is for photographic film in which polyvinyl alcohol is employed as the carrier for the silver halide in the photographic emulsion. As a rule the support for the photographic emulsion in a photographic film is a cellulose ester sheet. By making possible the adherence of polyvinyl alcohol to a cellulose ester sheet, photographic film consisting of polyvinyl alcohol emulsions and a cellulose ester support is made possible.

Another art in which our invention may be employed is photolithography. The use of bichromated polyvinyl alcohol for photolithographic printing has been described in various articles and treatises on the subject. Our invention provides an effective method for preparing photolithographic plates containing a cellulose ester support and a bichromated polyvinyl alcohol as the light-sensitive element.

In hectography, polyvinyl alcohol surfaces have been suggested as suitable for use. To reinforce those surfaces by laminating in accordance with our invention makes for a surface more resistant to the effects of continued use.

Figure 2:
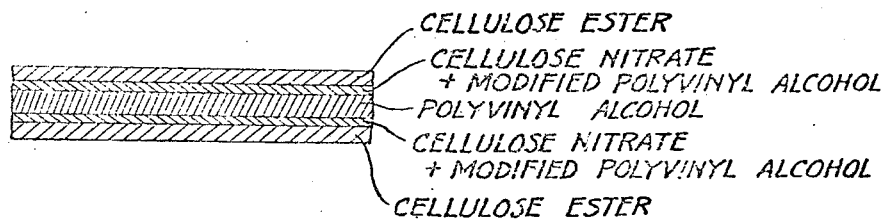
Figure 3:
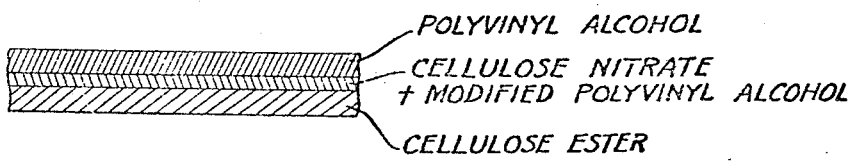

The accompanying drawing illustrates laminar sheeting in accordance with our invention. Fig. 1 illustrates a laminar sheet in which the support is only coated on one side, the support in this case being a lower fatty acid ester of cellulose such as cellulose acetate, cellulose acetate propionate or cellulose acetate butyrate. First, a coating essentially consisting of cellulose nitrate is applied to the support in a thin layer such as ordinarily employed in the subbing art. Next, a layer of a mixture of cellulose nitrate and modified polyvinyl alcohol is applied folowed by the application of a layer comprising polyvinyl alcohol being either polyvinyl alcohol without any admixture or a layer in which polyvinyl alcohol constitutes the major portion, such as a photographic emulsion in which polyvinyl alcohol is employed as the protective colloid. Fig. 2 illustrates a product in which a polyvinyl alcohol layer is protected by means of cellulose ester sheeting attached to both sides of the polyvinyl alcohol layer in accordance with our invention. This is an especially valuable feature where the polyvinyl alcohol contains some design or imprint which it is desirable to protect from wear and abrasion. For instance, this is a desirable arrangement where the polyvinyl alcohol layer embodies a grating for polarizing light. The soft polyvinyl alcohol layer is thoroughly protected by the laminations on each surface in the various uses in which it may be employed. Fig. 3 illustrates a laminar product containing the three essential layers in accordance with our invention.

The layers of cellulose nitrate and modified polyvinyl alcohol in the products of our invention are preferably made up of a mixture of equal parts of these two materials. However, the invention is not restricted to this ratio as the layer may be made up of any ratio of cellulose nitrate to modified polyvinyl alcohol lying within the range of from three parts of nitrate to one of modified polyvinyl alcohol to 1 part of cellulose nitrate to ten parts of modified polyvinyl alcohol.

The cellulose nitrate which may be employed is described in U. S. Patent 2,014,547 of G. S. Babcock as useful for subbing purposes. The subbing layers which are employed in accordance with our invention are preferably of the thickness specified in that patent for subbing layers although our invention is not limited to the degree of thinness specified as thicker layers may be employed if felt to be desirable.

The term "modified polyvinyl alcohol" employed herein is to be understood as referring to a vinyl compound, 65–85% of which is composed of polyvinyl alcohol. The best example of a compound of this nature is the product resulting from the hydrolysis of polyvinyl acetate to a point where the polyvinyl alcohol content thereof lies within the range 65–85%. The term "modified polyvinyl alcohol" however is to be understood as applying to polymeric compounds generally having a polyvinyl alcohol content of 65–85%. The remainder of the compound may be polyvinyl acetate (or acylate) polyvinyl acetal; polyvinyl chloride or other recurring substituents or a mixture of various recurring substituents.

It is to be understood that the term "modified polyvinyl alcohols" applies only to compounds in which 65–85% is made up of polyvinyl alcohol. It does not include a physical mixture of 100% polyvinyl alcohol with other materials such as polyvinyl acetate to give a mass having a polyvinyl alcohol content of 65–85% as the physical mixtures of this nature do not exhibit the desired properties as do the compounds defined by the term "modified polyvinyl alcohols."

The modified polyvinyl alcohols which have been found to be suitable for use in our invention are known on the open market. Some of the trade names employed to designate materials of this kind are RH-623, RH-403, RH-428 and the like these materials being marketed by the R & H Division of the Du Pont Company. It is desirable that the modified polyvinyl alcohol used be of a medium or high viscosity to give the highest wet adhesion. For instance, modified polyvinyl alcohols having viscosities within the range 20–50 C. P. S. (4% aqueous solution) have been found to be eminently suitable for use in our invention. It is also necessary that the modified polyvinyl alcohol employed be compatible with the cellulose nitrate and the solvent. Usually there will be little cause for concern on this score as the compounds defined under this term exhibit good compatibility as a rule.

In most cases it is preferable to employ a mixture of modified polyvinyl alcohols of different viscosities as this mixing seems to give layers having the optimum wet and dry adhesions as compared with the wet and dry adhesions of the layers using only single polyvinyl compounds therein.

The subbing layer of the mixture of cellulose nitrate and modified polyvinyl alcohol is applied from a solvent containing both water and an organic solvent. Any solvent which gives a fairly thin solution, which is compatible with the cellulose ester and can be coated out thereon and the solvent evaporated off may be employed. We have found that a solvent consisting of 25% methyl cellosolve, 12% water and the remainder methyl alcohol may be satisfactorily employed for applying the subbing layer. The use of modified polyvinyl alcohol necessitates the presence of some water in the solvent to give good solubility and homogeneity.

The cellulose ester sheet which is employed for the support may be either a lower fatty acid ester of cellulose such as cellulose acetate, cellulose acetate propionate or cellulose acetate butyrate or cellulose nitrate. In most instances, it is desirable to employ a transparent sheet such as is obtained by coating out the solution of a cellulose ester in a volatile solvent onto a film forming surface, or in other words, the type of sheeting ordinarily employed as the support for photographic film.

The cellulose ester may be for instance a cellulose acetate having an acetyl content of 40% or a hydrolyzed cellulose acetate propionate having a propionyl content of 15%, the remainder being acetyl. Ordinarily the cellulose esters employed for this purpose are of fairly high viscosity. For instance, a cellulose acetate containing 40.5% acetyl and a viscosity of 35–45 secs. (1 part in 4 parts of acetone) is eminently suited for coating out from acetone to form support. If desired plasticizer such as 25% of triphenyl phosphate may be incorporated therein.

There are some modifications or variations possible under our invention. Although basically our invention consists of a laminated material of cellulose ester sheet and polyvinyl alcohol layer with a layer of a mixture of cellulose nitrate and modified polyvinyl alcohol therebetween, additional layers may be present without departing from the spirit of our invention. Figure 1 of the drawing shows a laminar structure in which a cellulose nitrate layer is present. In some cases this additional layer facilitates the preparation of the laminar structure, while in other cases it adds nothing to the ease of manufacture.

Figure 2 of the drawing shows a laminar structure in which both surfaces of the polyvinyl alcohol layer are protected, this being a variation within the scope of our invention. In some cases it may be found that a polyvinyl alcohol photographic emulsion is not as easily applied directly to a layer of a mixture of cellulose nitrate and modified polyvinyl alcohol as to a layer of polyvinyl alcohol. Therefore, it may be desirable to apply a layer of polyvinyl alcohol to the layer of cellulose nitrate and modified polyvinyl alcohol attached to the cellulose ester support and then apply the polyvinyl alcohol emulsion layer thereover.

When the application of a cellulose nitrate subbing layer is considered desirable, it may be cellulose nitrate of the type described in the Babcock patent referred to above. The cellulose nitrate sub may be applied to the cellulose ester sheet in the manner described in that patent, or if desired it may be applied from a 2½% solution of the cellulose nitrate in a solvent mixture consisting of 3 parts of methanol and 1 part of acetone.

The polyvinyl alcohol layer is applied from an aqueous solution, the thickness of the layer depending upon the use for which it is to be employed.

To illustrate the invention, the table given shows five different combinations which have been employed. In these cases the subbing layer was a mixture of two polyvinyl alcohols of differing viscosities and cellulose nitrate. It has been our experience that the medium or high viscosity modified polyvinyl alcohols exhibit better wet adhesion than the low viscosity modified polyvinyl alcohols but the mixing of the latter with the former enhances the dry adhesion of the medium or high viscosity material and therefore is the preferable practice.

The medium or high viscosity modified polyvinyl alcohol used had a viscosity of 50 C. P. S. and a vinyl acetate content of 27%. The low viscosity modified polyvinyl alcohol used had a viscosity of 5 C. P. S. and a vinyl acetate content of 22.5%. The layer was coated from a solvent mixture composed of 25% methyl cellosolve, 12% water and sufficient methyl alcohol to make the entire composition of both solids and liquids amount to 100%.

*Modified polyvinyl alcohol*

| Medium or high viscosity | Low viscosity | Cellulose nitrate |
|---|---|---|
| Per cent | Per cent | Per cent |
| 1.25 | .25 | .3 |
| 1 | .5 | .3 |
| .75 | .75 | .3 |
| .5 | 1 | .3 |
| .25 | 1.25 | .3 |

The laminar structure of our invention is eminently suited for the various purposes for which it might be employed. For instance, if the material is to be employed as eyepieces in goggles, it can be stamped and fabricated to impart the proper form without undue cockle or distortion. This laminar structure will withstand various machining operations such as shearing, stamping, cutting and the like. If the material is to be employed for photographic purposes, it will withstand processing in photographic solutions and the wear and strain encountered in use.

What we claim and desire to secure by Letters Patent of the United States is:

1. A laminar structure comprising a cellulose ester support, a subbing layer essentially consisting of a mixture of cellulose nitrate and a polyvinyl compound, 65–85% of which is composed of polyvinyl alcohol, and a layer of polyvinyl alcohol, the layers in the structure being in the order given.

2. A laminar structure comprising a support of a lower fatty acid ester of cellulose, a subbing layer essentially consisting of a mixture of cellulose nitrate and a polyvinyl compound 65–85% of which is composed of polyvinyl alcohol, and a layer of polyvinyl alcohol, the layers in the structure being in the order given.

3. A laminar structure comprising a cellulose acetate support, a layer of cellulose nitrate, a subbing layer essentially consisting of a mixture of cellulose nitrate and a polyvinyl compound 65–85% of which is composed of polyvinyl alcohol, and a layer of polyvinyl alcohol, the layers in the structure being in the order given.

4. A laminar structure comprising a layer of cellulose nitrate, a subbing layer essentially consisting of a mixture of cellulose nitrate and a polyvinyl compound 65–85% of which is composed of polyvinyl alcohol, and a layer of polyvinyl alcohol, the layers in the structure being in the order given.

5. A laminar structure comprising a layer of polyvinyl alcohol, adhering to the faces of the polyvinyl alcohol layer, layers of a mixture of cellulose nitrate and a polyvinyl compound 65–85% of which is composed of polyvinyl alcohol and cellulose ester layers joined to the surface of the layers consisting of cellulose nitrate and the polyvinyl compound.

6. A method for uniting a layer of polyvinyl alcohol to a cellulose ester support which comprises first applying to the surface of the cellulose ester support a subbing layer essentially consisting of a mixture of cellulose nitrate and a polyvinyl compound 65–85% of which is composed of polyvinyl alcohol, and then applying a polyvinyl alcohol layer thereover.

7. A method of applying a layer of polyvinyl alcohol to a support of a lower fatty acid ester of cellulose which comprises applying to one surface of the cellulose ester sheet a thin layer of a mixture of cellulose nitrate and a polyvinyl compound 65–85% of which is composed of polyvinyl alcohol, and then applying a polyvinyl alcohol layer over the thin layer of cellulose nitrate and polyvinyl compound.

GALE F. NADEAU.
CLEMENS B. STARCK.